(12) United States Patent
Edara et al.

(10) Patent No.: US 11,300,543 B2
(45) Date of Patent: Apr. 12, 2022

(54) ANOMALY AND FAULT DETECTION OF INDUSTRIAL ASSETS USING MAGNETIC MAPPING

(71) Applicant: Honeywell International Inc., Morris Plains, NJ (US)

(72) Inventors: Thandava Krishna Edara, Plymouth, MN (US); Brad Westphal, Lino Lakes, MN (US)

(73) Assignee: Honeywell International Inc., Charlotte, NC (US)

( * ) Notice: Subject to any disclaimer, the term of this patent is extended or adjusted under 35 U.S.C. 154(b) by 217 days.

(21) Appl. No.: 16/683,099

(22) Filed: Nov. 13, 2019

(65) Prior Publication Data

US 2021/0140921 A1    May 13, 2021

(51) Int. Cl.
*G01N 27/82* (2006.01)
*B64C 39/02* (2006.01)

(52) U.S. Cl.
CPC ........... *G01N 27/82* (2013.01); *B64C 39/024* (2013.01); *B64C 2201/125* (2013.01)

(58) Field of Classification Search
CPC .............................. G01R 31/021; G01N 27/82
See application file for complete search history.

(56) References Cited

U.S. PATENT DOCUMENTS

| | | |
|---|---|---|
| 2016/0116914 A1 | 4/2016 | Mucci |
| 2016/0216304 A1* | 7/2016 | Sekelsky ................. B60L 53/32 |
| 2017/0097435 A1 | 4/2017 | Hull et al. |
| 2017/0329307 A1 | 11/2017 | Castillo-Effen et al. |

FOREIGN PATENT DOCUMENTS

CN    107145156 A    9/2017

\* cited by examiner

*Primary Examiner* — Minh Q Phan
(74) *Attorney, Agent, or Firm* — Shumaker & Sieffert, P.A.

(57) ABSTRACT

A method for performing an inspection of a utility asset includes obtaining current magnetic signature data for at least one electrical asset; comparing the current magnetic signature data to a model describing an expected change in the electrical asset's magnetic signature over time; and determining a current state-of-wear of the at least one electrical asset based on the comparison to the model.

20 Claims, 4 Drawing Sheets the present disclosure. 
ANOMALY AND FAULT DETECTION OF INDUSTRIAL ASSETS USING MAGNETIC MAPPING

TECHNICAL FIELD

This disclosure relates to inspection systems.

BACKGROUND

Large-scale industrial companies, especially in utilities, oil, and gas, may own a complex asset infrastructure that needs to be inspected periodically to ensure high productivity. These inspections are currently done with a wide range of sensing equipment such as visual, infrared, spectral, and other sensors. However, there is often an information gap in the data that is collected through these sensing methods. As a result, assets may be at risk of failing unexpectedly, costing significant losses in both money and productivity.

SUMMARY

In general, this disclosure relates to systems and techniques for inspecting and monitoring an electromagnetic signature of at least one utility asset. As described herein, a computing system is configured to evaluate the condition of a utility asset by comparing its current magnetic signature to a model describing a typical or expected "lifespan" of the magnetic signature of the asset.

In one example, this disclosure describes a method for inspecting utility asset infrastructure, the method comprising obtaining, by a computing system, current magnetic signature data for at least one electrical asset; comparing, by the computing system, the current magnetic signature data to a model describing an expected change in the electrical asset's magnetic signature over time; and determining, by the computing system, a current state-of-wear of the at least one electrical asset based on the comparison to the model.

In another example, this disclosure describes a computing system comprising a memory and one or more processing circuits configured to obtain current magnetic signature data for at least one electrical asset; compare the current magnetic signature data to a model describing an expected change in the electrical asset's magnetic signature over time; and determine a current state-of-wear of the at least one electrical asset based on the comparison to the model.

In another example, this disclosure describes a non-transitory computer-readable storage medium having instructions stored thereon that, when executed, cause a computing system to obtain current magnetic signature data for at least one electrical asset; compare the current magnetic signature data to a model describing an expected change in the electrical asset's magnetic signature over time; and determine a current state-of-wear of the at least one electrical asset based on the comparison to the model.

The details of one or more examples of the disclosure are set forth in the accompanying drawings and the description below. Other features, objects, and advantages will be apparent from the description, drawings, and claims.

DETAILED DESCRIPTION

Figure 1:
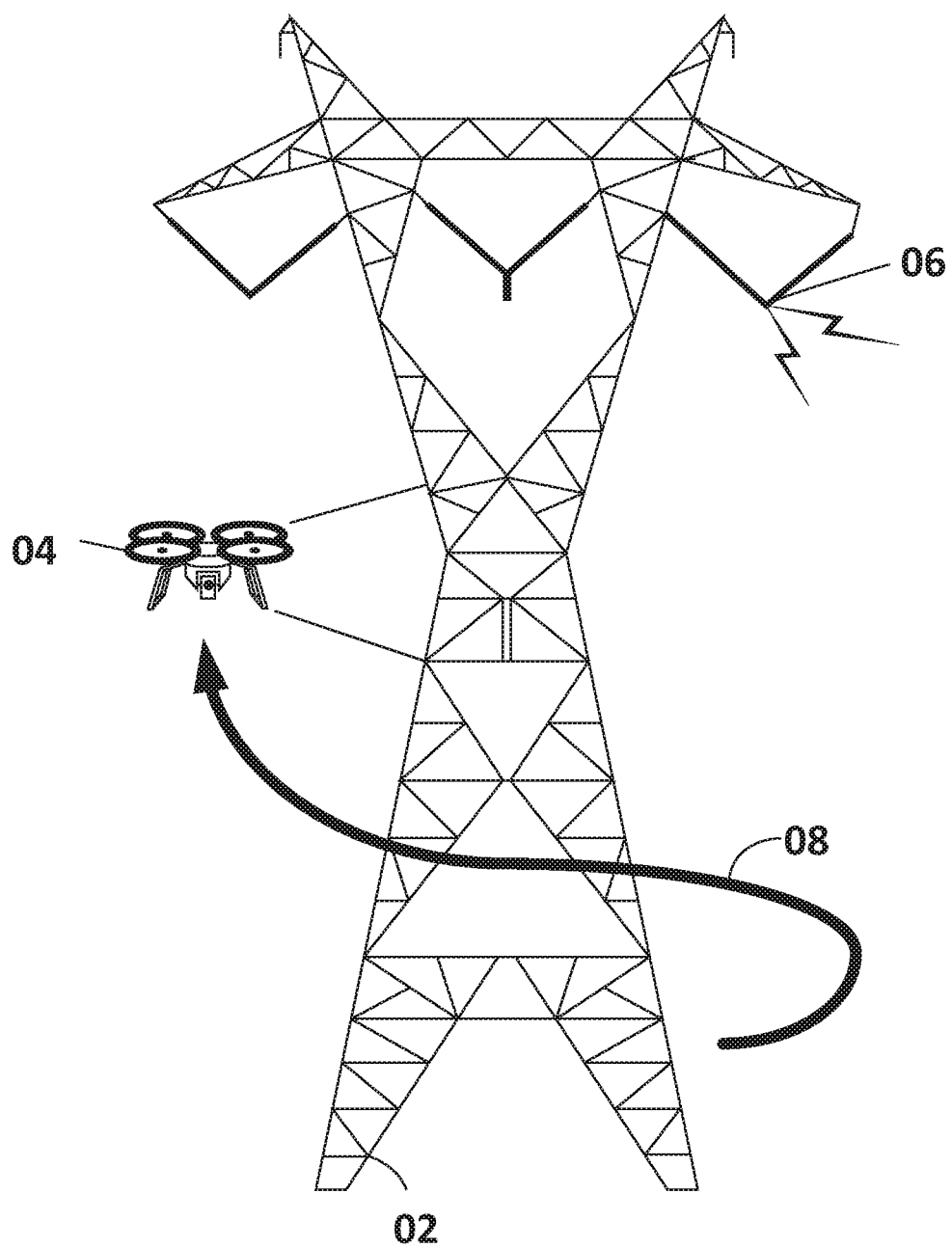
FIG. 1 is a conceptual diagram depicting an example magnetic-signature-based utility-asset inspection, which may be conducted according to one or more techniques of this disclosure.

FIG. 1 is a conceptual diagram depicting an example magnetic-signature-based utility-asset inspection, which may be conducted according to one or more techniques of this disclosure. Large-scale industrial companies, such as utilities, oil, and natural gas, may own or otherwise manage a complex asset infrastructure 02. In the example depicted in FIG. 1, asset infrastructure 02 is represented by a transmission tower for an electric powerline; however, asset infrastructure 02 may include any type of structural utility assets, such as powerlines, pipelines, data (fiber-optic) cables, factories, plants, solar panels, wind turbines, or other structures or facilities. As shown in FIG. 1, utility asset infrastructure 02 may require periodic inspections to maintain high productivity. The overseeing company (or other controlling entity, such as a governmental administrative body) may employ any of a number of different types of sensing or detection equipment to collect various types of data describing different aspects of the infrastructure. Some non-limiting examples of current sensing equipment include x-ray systems, infrared systems, sonar systems, radar detectors, optical systems, and hybrid multispectral cameras.

In some examples, this sensing equipment may be mounted on one or more mobile vehicles configured to conduct the inspection. For example, as depicted in FIG. 1, a detector or other sensing equipment may be mounted on one or more small unmanned aerial vehicles (UAVs) 04, due to the UAVs' ability to quickly collect high-quality data in hard-to-reach locations. UAV 04 is depicted in FIG. 1 as a quadcopter, but UAV 04 may be any type of UAV including, but not limited to, a rotorcraft, a fixed wing aircraft, compound aircraft such as tilt-rotor, X2 and X3, an aerostat, or any other such type of UAV including all vertical take-off and landing (VTOL), tail-sitter, etc. UAV 04 may be configured to fly with various degrees of autonomy. In some examples, UAV 04 may use light-detection and ranging (LIDAR) for collision avoidance. UAV 04 may, for example, be a relatively small, low altitude, and low-speed UAV, where in this context, small corresponds to under 100 lbs., low altitude corresponds to operating altitudes less than 3000 feet above ground (e.g., 400 feet or less), and low air speed corresponds to air speeds less than 250 knots (e.g., 10 knots). Furthermore, it is contemplated that UAV 04 may have hovering capabilities, meaning UAV 04 may have the capability of remaining at an approximately constant location in the air. Although FIG. 1 depicts UAV 04 as the vehicle performing the inspection, in other examples, a sensing-equipment payload may be mounted on any type of vehicle, such as a ground vehicle. In other examples, sensing equipment, including magnetic sensors, may be fixed or mounted directly onto asset infrastructure 02 itself.

In some examples in accordance with this disclosure, magnetic sensing equipment installed on UAV 04 may detect a characteristic magnetic signature of utility asset infrastructure 02, as generated by any of various electromagnetic components within the structure. A computing system may then evaluate the condition of infrastructure 02 by comparing the data captured by vehicle 04 to other magnetic signature data. For example, the computing system may compare the current magnetic signature data to a magnetic signature model describing an expected or typical change in magnetic signature over time. From this comparison, the computing system may determine an estimated current state-of-wear of the infrastructure 02, and accordingly, an estimated remaining useful lifespan of the infrastructure 02. Based on the estimated remaining lifespan, the computing system may output a "repair" or a "replace" recommendation. From the comparison, the computing system may also identify any discrepancies between the two data sets, such as indicative of a magnetic anomaly within the infrastructure. For example, the computing system may identify a short circuit (e.g., a lack of a magnetic signature where one would otherwise be expected) or an open circuit 06 (e.g., a substantially "stronger" magnetic signature than expected) based on the comparison. The computing system may request or control additional inspections based on any identified anomalies to collect further data, such as by using other types of sensors.

In some examples, inspection vehicle 04 (such as a UAV) may use the attached magnetic sensing equipment for assistance in navigation or guidance. For example, some infrastructure 02 having a relatively strong magnetic signature that can interfere with a vehicle's default guidance systems (such as GPS, radio-frequency, or other electromagnetic-based guidance systems) or detecting equipment. In these examples, inspection vehicle 04 may determine, based on data collected by its magnetic sensing equipment (for example, based on a particularly strong magnetic field measurement), that it is too close to infrastructure 02. In these examples, vehicle 04 may be configured to automatically "retreat" or back away from infrastructure 02. In other examples, such as when vehicle 04 is manually controlled by a user, vehicle 04 may be configured to inform the user that vehicle 04 is too close to infrastructure 02, and accurate navigation or guidance may be in jeopardy. In some examples, vehicle 04 may include data stored in memory indicating the locations of particularly strong magnetic fields, and be configured to avoid (e.g., remain a threshold distance from) those locations.

In some examples, vehicle 04 may be configured to recognize a characteristic magnetic signature of infrastructure 02, and navigate around or between infrastructure assets 02 based on the characteristic magnetic signature. For example, vehicle 02 may have stored in memory a magnetic signature "map" relating characteristic magnetic signatures to respective asset locations, and then navigating its trajectory by locating the current magnetic signature data on the stored map. In some examples, the magnetic sensing equipment may be also be used by an inspector to ensure that an asset is not "live" or "hot" before performing a manual inspection, for an added layer of safety.

Figure 2:
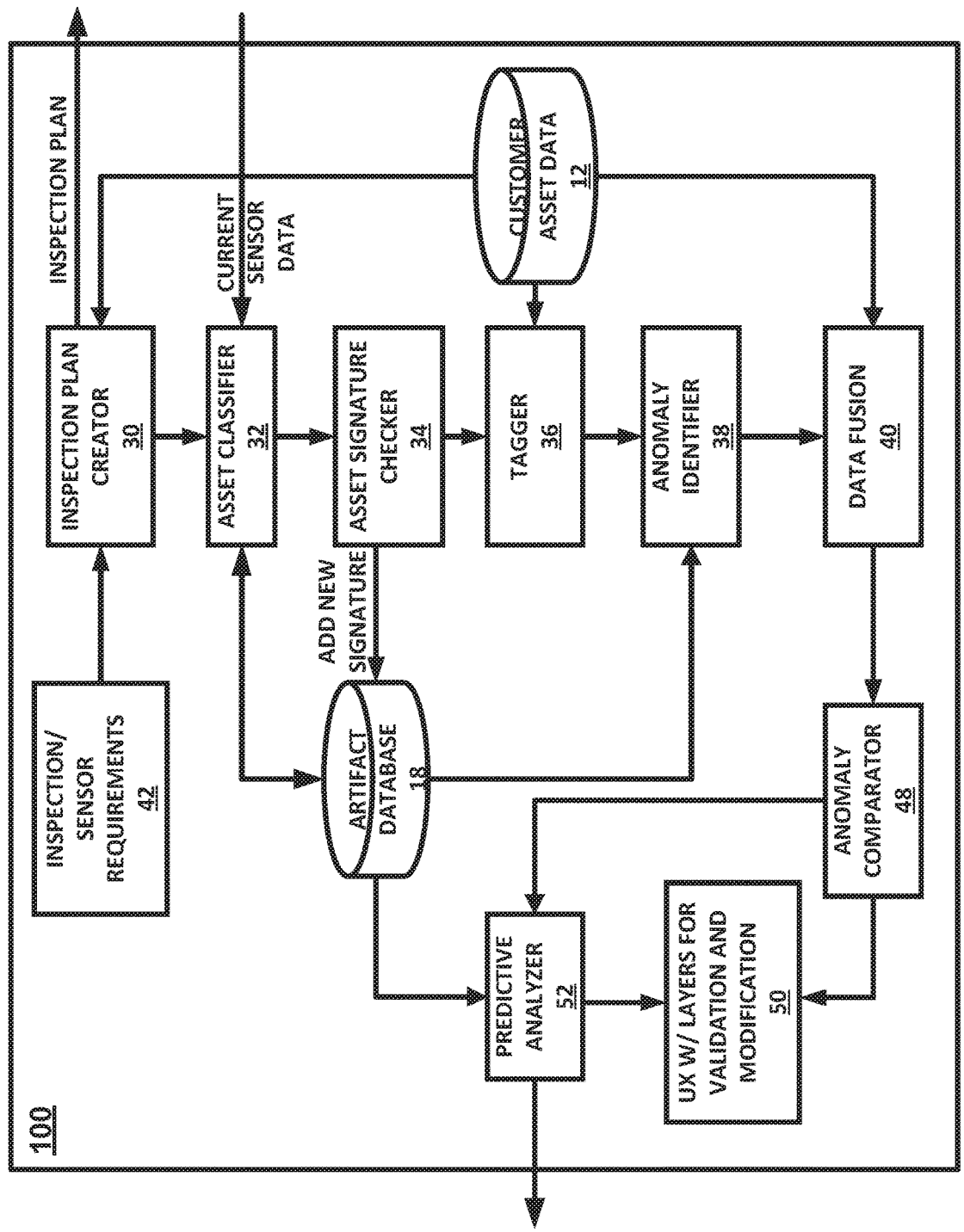
FIG. 2 is a block diagram illustrating an example computing system for evaluating the electromagnetic signature of a utility asset, in accordance with some techniques of the present disclosure.

FIG. 2 is a block diagram illustrating an example computing system 100 for inspecting and/or evaluating utility asset infrastructure, in accordance with one or more techniques of the present disclosure. In the example of FIG. 2, system 100 may represent a computing device or computing system, such as a mobile computing device (e.g., a smartphone, a tablet computer, a personal digital assistant, and the like), a desktop computing device, a server system, a distributed computing system (e.g., a "cloud" computing system), or any other device capable of receiving data and performing the techniques described herein. Computing system 100 comprises at least a memory and processing circuitry configured to execute the modules or sub-routines described further below. The example of FIG. 2 depicts the various modules as separate entities, but any or all of the modules may be performed by the same processing circuitry, or as part of the same process or method step.

Computing system 100 includes inspection plan creator 30. Plan creator 30 receives asset data 12 indicating, for example, a type of utility asset infrastructure (powerlines, pipelines, transmission towers, facilities, etc.) and a location of the infrastructure. Plan creator 30 also receives inspection data 42 indicating parameters, constraints, or requirements for a utility asset infrastructure inspection, including the sensing equipment to be used during the inspection. Using asset data 12 and inspection data 42, plan creator 30 generates a utility-asset-infrastructure inspection plan, indicating, for example, a route (e.g., a flightplan) for vehicle 04 (FIG. 1) to navigate around infrastructure 02. Computing system may output the inspection plan, such as for display to a user (such as the operator of the UAV and/or ground vehicle 04), or alternatively, may output the inspection plan directly to vehicle 04 so that the vehicle may autonomously collect magnetic sensor data. For example, a magnetic sensor may collect any data indicative of a magnetic field, such as a field strength (e.g., magnitude), direction, magnetic flux, and/or magnetic induction. A magnetic "signature" for an asset may include any one of, or a combination of any of, these magnetic elements.

Computing system 100 includes asset classifier 32. Asset classifier 32 receives the current magnetic sensor data from magnetic sensing equipment, and artifact data from artifact database 18, and compares the two data sets in order to identify one or more individual asset components from the current magnetic sensor data. For example, asset classifier 32 may receive sensor data for an entire electrical transmission facility and break the data up into groups of asset components having similar magnetic signatures, such as those describing transmission lines, transmission towers, transformers, etc.

Computing system 100 includes signature checker 34. Signature checker 34 is configured to determine whether artifact database 18 already contains an existing "model" magnetic-signature dataset for each of the individual asset components identified by asset classifier 32. Model magnetic-signature data may include, for example, data describing an expected (e.g., an "average" or typical) change in magnetic signature as the signature changes (e.g., wears or degrades) over time through use, etc. For example, model magnetic signature data may include sensor data from previous inspections, as well as a regressive analysis performed on the previous sensor data in order to estimate a near-continuous description of the change in the asset's magnetic signature over time for its entire useful lifespan (e.g., up until one or more individual components degrades to a degree such that the component is no longer performing adequately for its respective intended function). In other examples, model magnetic signature data may be an entirely theoretical model lifespan of the respective asset(s) (e.g., is not based on any collected sensor data).

For example, a model magnetic signature "lifespan" may depict an average decay in magnetic field strength (e.g., magnitude) over time, such as an approximately linear decay, an exponential decay, or a logarithmic decay. In other examples, a model magnetic signature "lifespan" may depict an average increase in the signal-to-noise ratio for one or more parameters over time, such as a field strength (e.g., magnitude), direction, magnetic flux, and/or magnetic induction. For example, the model lifespan may depict an approximately linear, exponential, or logarithmic increase in the signal-to-noise ratio for one or more magnetic parameters of an electrical asset over time.

In some examples, model magnetic signature data may also describe or indicate a "baseline," "healthy," or "properly functioning" magnetic component (e.g., either a "brand new" asset having zero change due to use or wear, or an asset having an amount of change that is below a pre-determined wear-threshold). If signature checker 34 identifies a magnetic signature model for an asset component within artifact database 18, checker 34 retrieves the model data. If signature checker 34 does not identify a magnetic signature model for a particular component or artifact, signature checker 34 may retrieve or request a model for that artifact from an outside source, such as a user or external database.

Computing system 100 includes tagger 36. Tagger 36 receives current magnetic signature data and magnetic signature model data for each of the individual asset components and "tags" the current signature data with both a specific geolocation and a type of asset.

Computing system 100 includes anomaly identifier 38. Anomaly identifier 38 receives the current magnetic signature data and the model magnetic signature data, and compares the two data sets to identify any discrepancies between the two, such as when current magnetic signature data (or a component thereof) cannot be easily matched (e.g., identified, within a given tolerance) at any point along the model data. Identifier 38 marks any identified discrepancy between the two data sets as a potential magnetic anomaly and outputs the geolocation of the anomaly.

Computing system 100 includes data fusion module 40. Data fusion module 40 receives a list of geolocations of potential magnetic anomalies from identifier 38. Using the locations, fusion module 40 obtains further data sets from asset database 12, describing other aspects of the assets in the same locations. For example, data fusion module 40 may retrieve other inspection data, such as visual photographs, x-ray images, optical data, hybrid multispectral imagery, or other data describing the asset components at the same geolocations as the potential magnetic anomalies. Fusion module 40 combines the magnetic signature data with the other sensor data, and outputs the fused data in the form of a multi-layer, 3-D environmental map of the asset infrastructure to anomaly comparator 48.

Computing system 100 includes anomaly comparator 48. Anomaly comparator 48 receives fused sensor data from fusion module 40. Anomaly comparator 48 determines whether the other sensor data similarly indicates an anomaly in the same location as the magnetic signature data, and, if so, attempts to determine a cause. For example, anomaly comparator 48 may determine that a photographic image depicts a broken wire where the magnetic signature data indicates a potential open circuit.

Computing system 100 includes user experience (UX) generator 50. UX generator 50 is configured to output for display the anomaly determinations made by comparator 48, so that a user may verify the conclusions regarding the magnetic anomaly. For example, UX generator may output the image of the broken wire and prompt a user to verify whether the wire is, in fact, broken.

In some examples, computing system 100 includes predictive analyzer 52. Predictive analyzer 52 is configured to retrieve from artifact database 18 the magnetic signature model data, indicating the change in an asset's magnetic signature over time, such as while the asset naturally degrades through use or wear. Predictive analyzer 52 is configured to match the current magnetic signature data with a particular point (such as the most-similar point) along the timeline of the model magnetic signature data. Predictive analyzer 52 is configured to determine, based on the matched signature points, a state-of-wear of the respective asset or asset component, and accordingly, an estimated remaining useful lifespan of the asset component. For example, a state-of-wear may describe a percent of lifespan remaining, a predicted amount of time remaining in the useful lifespan (e.g., assuming constant or periodic use), a predicted number or remaining uses, or a particular classification status, such as "new", "working", "needs replacement", etc. Based on the estimated remaining lifespan, predictive analyzer may generate and output a recommendation (e.g., back via UX 50) to repair and/or replace the asset component. In some examples, UX 50 may provide a validation mechanism through which a user may approve or disapprove of the "repair or replace" recommendation, such that system 100 may update its "repair or replace" recommendation threshold based on the user's validation input. In some examples, UX 50 may allow a user to explicitly set the recommendation threshold level, such as at 5% of an asset component's useful lifespan remaining.

Figure 3:
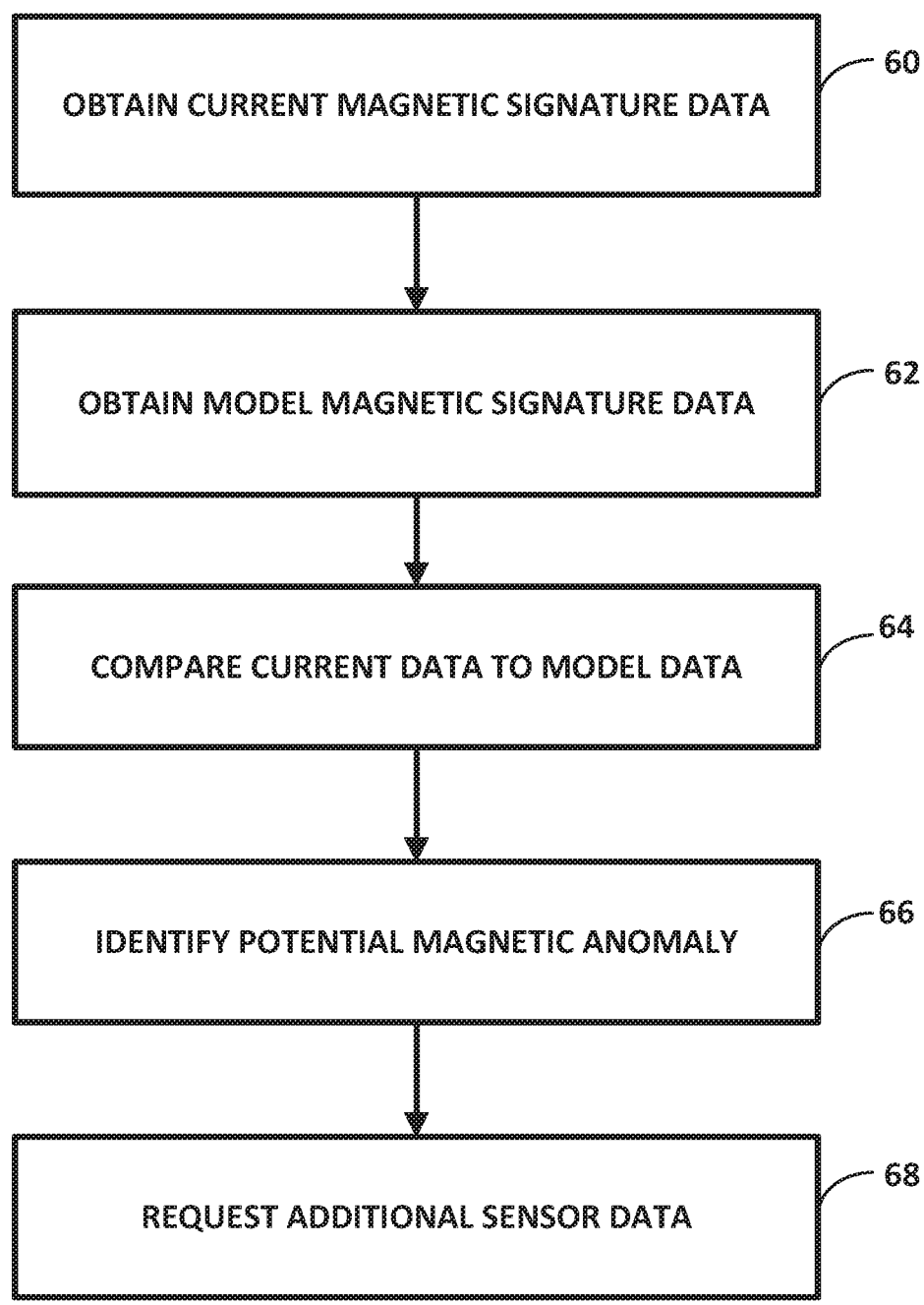
FIG. 3 is a flowchart illustrating an example operation for inspecting and monitoring the electromagnetic signature of a utility asset, in accordance with a technique of this disclosure.

FIG. 3 is a flowchart illustrating an example operation for inspecting and monitoring the electromagnetic signature of a utility asset, in accordance with one or more techniques of this disclosure. In some examples, the techniques of FIG. 3 may be performed by computing system 100 of FIG. 2. Computing system 100 receives current magnetic signature data, as captured by a magnetic sensor during a utility asset infrastructure inspection (60).

Computing system 100 further receives (e.g., receives via user input or retrieves from memory) model magnetic signature data, describing the magnetic signature of "healthy", "typical," "average,", or "properly functioning" asset infrastructure as it changes over time during its useful lifespan (62). Computing system 100 may then compare the current magnetic signature data to the model magnetic signature data (64) to identify any discrepancies between the two (66), such as when computing system 100 cannot match the current data (or a particular magnetic component described within the current data) to any point along the model data. If such a discrepancy is found, system 100 may determine the discrepancy to be a potential "magnetic anomaly" within the asset infrastructure, which may require further inspection attention. If system 100 identifies a magnetic anomaly, system 100 may obtain (e.g., request user input or retrieve from memory) additional inspection data from different types of sensors in order to determine a source or cause of the magnetic anomaly (68). System 100 may then output an indication of the magnetic anomaly or its potential source.

Figure 4:
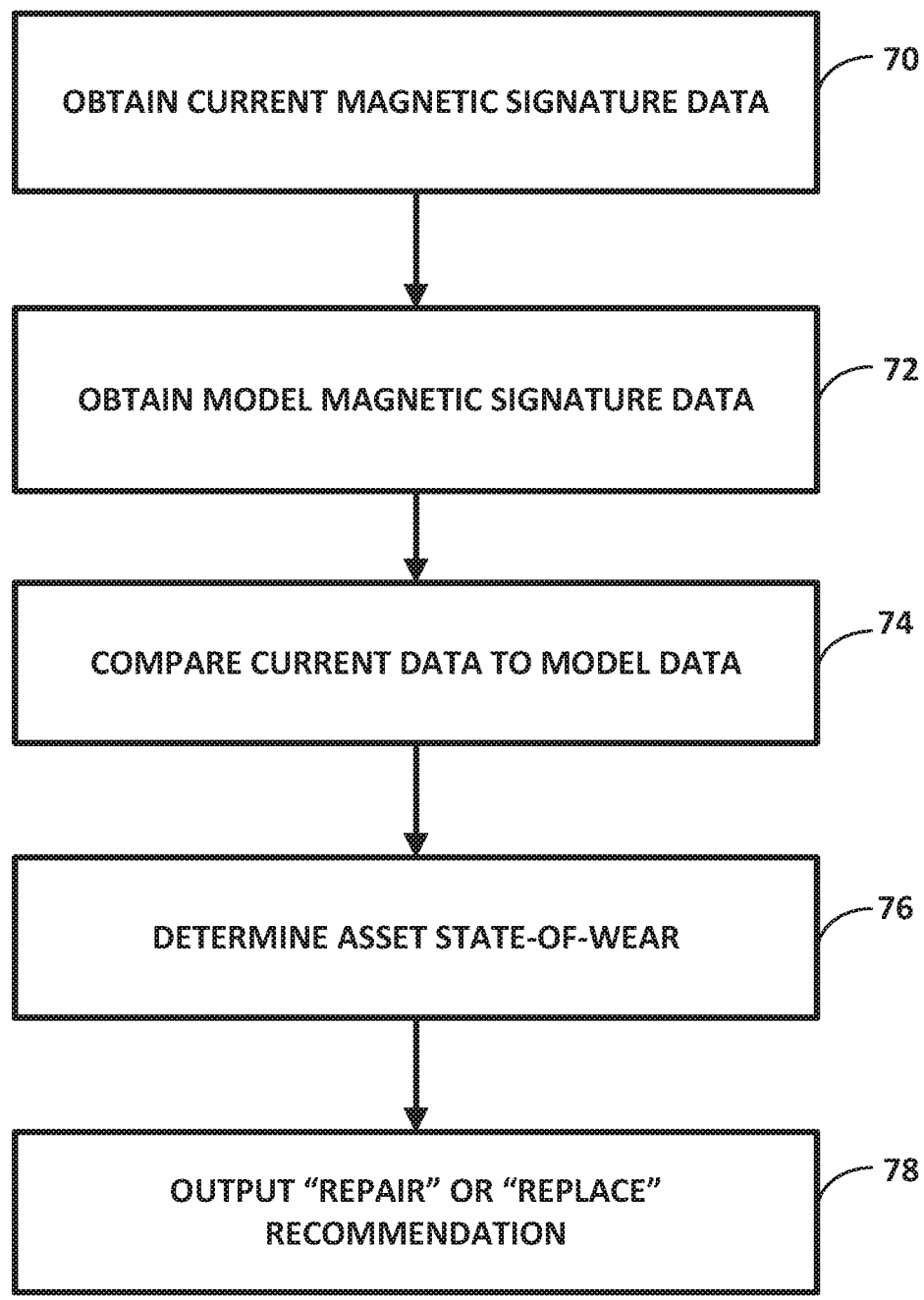
FIG. 4 is a flowchart illustrating an example operation for inspecting and monitoring the electromagnetic signature of a utility asset, in accordance with a technique of this disclosure.

FIG. 4 is a flowchart illustrating an example operation for inspecting and evaluating the magnetic signature of utility asset infrastructure, in accordance with one or more techniques of this disclosure. In some examples, the techniques of FIG. 4 may be performed by computing system 100 of FIG. 2. Computing system 100 receives current magnetic signature data, as captured by a magnetic sensor during a utility asset infrastructure inspection (70). Computing system 100 further receives (e.g., receives via user input or retrieves from memory) model magnetic signature data, describing the expected (e.g., normal or typical) change in the infrastructure's magnetic signature over time, due to natural entropy from use of the infrastructure (72). Computing system 100 may then compare the current magnetic signature data to the model magnetic signature data (74) to determine (e.g., estimate) a current state-of-wear of the infrastructure (76), and accordingly, an estimated remaining useful lifespan of the infrastructure or one or more of its components. Based on the estimated state-of-wear, computing system 100 may generate and output a recommendation to repair or replace the respective components within a certain time period (78). For example, system 100 may determine that the state-of-wear (e.g., "5% of useful lifespan remaining") is below a pre-determined threshold, and may automatically output a "repair or replace" recommendation to a user. Additionally, computing system 100 may store the current magnetic signature data along with previous magnetic signature measurements, so as to monitor the change in magnetic signature over time. Computing system 100 may use the stored data to improve future estimations of the state-of-wear of the infrastructure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Cloud technology used to automatically save the images on web server is not limited to local or global internet cloud. It can be a private and/or public cloud which is protected by the user ID and passwords. The passwords may not limit to one or two.

Various examples have been described. These and other examples are within the scope of the following claims.

What is claimed is:

1. A method for performing a utility inspection, the method comprising:
   obtaining, by a computing system, current magnetic signature data for at least one electrical asset;
   comparing, by the computing system, the current magnetic signature data to a model describing an expected change in the electrical asset's magnetic signature over time; and
   determining, by the computing system, a current state-of-wear of the at least one electrical asset based on the comparison to the model, wherein determining the state-of-wear comprises determining a remaining useful lifespan of the at least one electrical asset based on the comparison.

2. The method of claim 1, wherein the model comprises at least magnetic signature data indicative of a properly functioning state-of-wear of the at least one electrical asset.

3. The method of claim 1, wherein determining the state-of-wear further comprises identifying, by the computing system, a magnetic anomaly within the at least one electrical asset based on the comparison.

4. The method of claim 3, further comprising requesting, by the computing system, additional sensor data in response to identifying the magnetic anomaly.

5. The method of claim 1, wherein the remaining useful lifespan comprises an estimated remaining number of uses of the at least one electrical asset.

6. The method of claim 1, wherein the remaining useful lifespan comprises an estimated remaining time duration of continuous use of the at least one electrical asset.

7. The method of claim 1, wherein the computing system comprises a computing system of an unmanned aerial vehicle (UAV).

8. The method of claim 1, further comprising generating, by the computing system, a repair or replace recommendation based on the determined state-of-wear.

9. The method of claim 1, further comprising causing, by the computing system, a display device to display an indication of the remaining useful lifespan of the at least one electrical asset based on the comparison.

10. A computing system comprising:
a memory; and
processing circuitry configured to:
obtain current magnetic signature data for at least one electrical asset;
compare the current magnetic signature data to a model describing an expected change in the electrical asset's magnetic signature over time; and
determine a current state-of-wear of the at least one electrical asset based on the comparison to the model, wherein determining the state-of-wear comprises determining a remaining useful lifespan of the at least one electrical asset based on the comparison.

11. The system of claim 10, wherein the model comprises at least magnetic signature data indicative of a properly functioning state-of-wear of the at least one electrical asset.

12. The system of claim 10, wherein the processing circuitry is further configured to determine the current state-of-wear by identifying a magnetic anomaly within the at least one electrical asset based on the comparison.

13. The system of claim 12, wherein the processing circuitry is further configured to request additional sensor data in response to identifying the magnetic anomaly.

14. The system of claim 10, wherein the remaining useful lifespan comprises an estimated remaining number of uses of the at least one electrical asset.

15. The system of claim 10, wherein the remaining useful lifespan comprises an estimated remaining time duration of continuous use of the at least one electrical asset.

16. The system of claim 10, wherein the computing system comprises a computing system of an unmanned aerial vehicle (UAV).

17. The computing system of claim 10, wherein the processing circuitry is further configured to cause a display device to display an indication of the remaining useful lifespan of the at least one electrical asset based on the comparison.

18. A non-transitory computer-readable storage medium having instructions stored thereon that, when executed, cause a computing system to:
obtain current magnetic signature data for at least one electrical asset;
compare the current magnetic signature data to a model describing an expected change in the electrical asset's magnetic signature over time; and
determine a current state-of-wear of the at least one electrical asset based on the comparison to the model, wherein the state-of-wear comprises a remaining useful lifespan of the at least one electrical asset.

19. The medium of claim 18, wherein the model comprises at least magnetic signature data indicative of a properly functioning state-of-wear of the at least one electrical asset.

20. The medium of claim 18, wherein the instructions further cause the computing system to determine the current state-of-wear by identifying a magnetic anomaly within the at least one electrical asset based on the comparison to the model.

* * * * *